United States Patent
Williamson

(10) Patent No.: US 10,139,610 B2
(45) Date of Patent: Nov. 27, 2018

(54) BROADBAND CATADIOPTRIC MICROSCOPE OBJECTIVE WITH SMALL CENTRAL OBSCURATION

(71) Applicant: NIKON CORPORATION, Tokyo (JP)

(72) Inventor: David M. Williamson, Tucson, AZ (US)

(73) Assignee: NIKON CORPORATION, Tokyo (JP)

( * ) Notice: Subject to any disclaimer, the term of this patent is extended or adjusted under 35 U.S.C. 154(b) by 0 days.

(21) Appl. No.: 15/762,423

(22) PCT Filed: Oct. 25, 2016

(86) PCT No.: PCT/US2016/058603
§ 371 (c)(1),
(2) Date: Mar. 22, 2018

(87) PCT Pub. No.: WO2017/074908
PCT Pub. Date: May 4, 2017

(65) Prior Publication Data
US 2018/0275387 A1 Sep. 27, 2018

Related U.S. Application Data

(60) Provisional application No. 62/248,486, filed on Oct. 30, 2015.

(51) Int. Cl.
*G02B 21/04* (2006.01)
*G02B 21/16* (2006.01)
*G02B 17/08* (2006.01)

(52) U.S. Cl.
CPC ......... *G02B 21/04* (2013.01); *G02B 17/0892* (2013.01); *G02B 21/16* (2013.01)

(58) Field of Classification Search
CPC ........ G02B 23/00; G02B 23/02; G02B 23/06; G02B 23/10
USPC .......................................... 359/399, 421, 422
See application file for complete search history.

(56) References Cited

U.S. PATENT DOCUMENTS

| 5,999,310 A | 12/1999 | Shafer et al. |
| 2008/0174861 A1 | 7/2008 | Uzaw et al. |
| 2013/0010376 A1 | 1/2013 | HataKeyama |

OTHER PUBLICATIONS

Shafer, D. R., et al., "Small Catadioptric Microscope Optics," Proceedings of SPIE, vol. 5523, Issue 1, Oct. 14, 2014.
Huang, P., et al., "Achromatic Catadioptric Microscope Objective in Deep Ultraviolet with Long Working Distance," Proceeding of SPIE vol. 5524, pp. 125-133 (SPIE, Bellingham, Washington, 2004).

*Primary Examiner* — Robert E Tallman
(74) *Attorney, Agent, or Firm* — Yakov S. Sidorin; Quarles & Brady LLP

(57) ABSTRACT

A catadioptric microscope objective color-corrected for any wavelength in 190 nm to 1000 nm operational range and containing primary spherical front-surface mirror devoid of a through-hole and rear-surface plane-parallel mirror, each of which mirrors has a corresponding reflective annular coating defining an aperture formed in such coating coaxially with the optical axis. The objective, devoid of a Mangin element, is configured such that for any optical field with a diameter smaller than about 50 microns the Strehl ratio is no lower than 0.0781, and/or longitudinal spherical aberration is no larger than 0.0008 mm, and/or the astigmatism is smaller than 0.0005 mm, and/or distortion is smaller than 0.012 percent within the operational range.

13 Claims, 9 Drawing Sheets

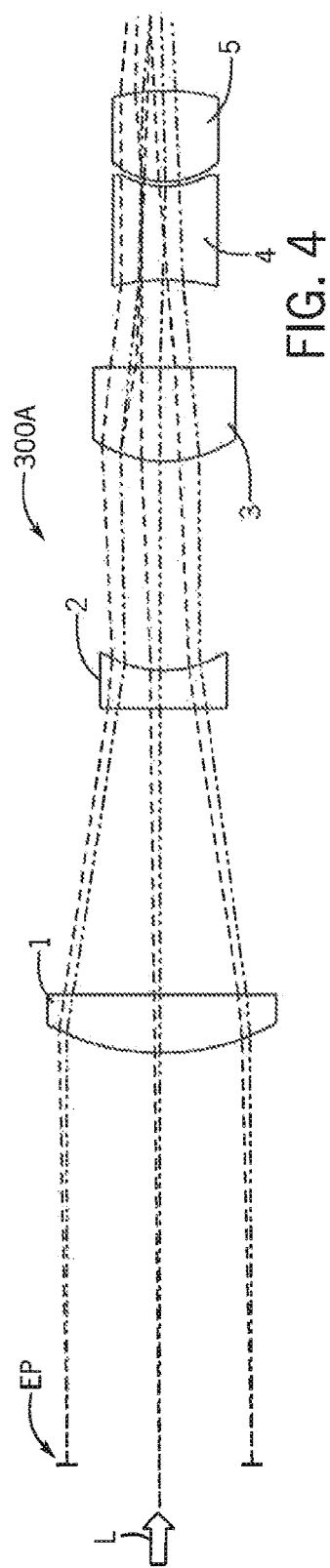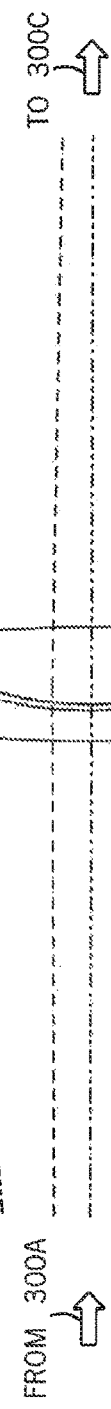

BROADBAND CATADIOPTRIC MICROSCOPE OBJECTIVE WITH SMALL CENTRAL OBSCURATION

CROSS-REFERENCE WITH RELATED APPLICATIONS

The present application is a U.S. National Phase of PCT/US2016/058603, filed on Oct. 25, 2016, which claims priority from and benefit of the U.S. Provisional Patent Application No. 62/248,486 titled "Broadband Catadioptric Microscope Objective With Small Central Obscuration" filed on Oct. 30, 2015. The disclosure of each of these patent applications are incorporated herein by reference.

TECHNICAL FIELD

The present invention relates generally to microscope objectives and, in particular, to a dry catadioptric microscope objective having a primary front-surface concave mirror and a secondary rear-surface plane-parallel-substrate mirror, neither of which has an opening through a corresponding substrate and each of which has a corresponding thin-film reflector that defines an optical aperture centered at the optical axis of the objective.

BACKGROUND

Various industrial and research applications benefit from spectrally-broadband imaging, including imaging in the deep UV (DUV) portion of the spectrum. Some applications further require immersion, cover glass correction, or operation over a wide temperature range. To be suitable for general use, microscope objectives need to be easily manufacturable, small enough to fit into a standard microscope, and have a reasonable cost.

The currently available microscope optics include those configured according to three different designs (dioptric (refractive), catoptric (reflective), and catadioptric (reflective+refractive)). Of the currently available objectives utilizing these design approaches, a very limited number are capable of good performance with high resolution below 400 nm. The optimized operation of a typical on-axis dioptric microscope objective is limited to the visible portion of the spectrum (for example, to the range from 400 nm to 700 nm or so). In case of the catadioptric design, the additional complication arises that the central obscuration present at least in a primary mirror of the catadioptric objective limits the optical transfer function of the system, resulting in lost sensitivity to certain spatial features of the sample interrogated with the microscope equipped with such objective. While the change of a design to an off-axis design may somewhat increase the width of the operational spectral bandwidth, an off-axis catadioptric objective becomes too bulky, big, and complicated to be of practical use in a standard setting.

Accordingly, there remains a need in redesign of a microscope objective and, in particular, the catadioptric objective for stable, low aberration operation across the spectral window or band ranging from DUV to the near IR optical projection system while minimizing the dimensions of the central obscuration present in the objective optics.

SUMMARY

Embodiments of the invention provide a dry microscope objective (that is, a microscope objective configured to operate without immersion in an index-matching fluid) and having an optical axis. The objective includes a first group of lenses defining an afocal optical relay unit; a second group of lenses, said second group of lenses having a positive refractive optical power; and a catadioptric group of optical elements. The catadioptric group of optical elements is fully defined by (i) a primary front-surface concave mirror, which has a first substrate with a concave front surface carrying a reflective coating thereon and a rear surface facing the second group of lenses, where the reflective coating has an opening (optionally, with a closed circular perimeter), such opening being coaxial with the optical axis, and (ii) a secondary rear-surface mirror, which has a second substrate (optionally configured as a plane-parallel plate) and a rear surface of the secondary mirror facing away from the concave front surface, while the front surface of said secondary mirror faces the concave front surface. In one implementation, such objective may be configured to be devoid of a Mangin element and/or devoid of a third substrate between a surface of the first substrate and a surface of the second substrate. In addition or alternatively to the lack of any of such elements, the objective may be structured such that the rear surface and the concave front surface of the primary front-surface mirror are not concentric with one another. Furthermore, the rear surface of the secondary mirror may be perpendicular to the optical axis in one embodiment, while (or as an alternative to) having the second group of lenses include first and second meniscus lenses that are immediately adjacent to one another (where a concave surface of the first meniscus lens and a concave surface of the second meniscus lens facing each other).

Embodiments of the invention additionally provide a method for optically imaging a specimen with an objective having an optical axis, which method includes (a) collecting first light from the specimen through a first aperture in a first reflective coating carried by a first surface of a plane-parallel mirror of the objective to form second light, the first surface being immediately adjacent to the object, and (b) transmitting the second light, that has reflected from a second reflective coating carried by a front surface of a concave mirror and has traversed a substrate of the plane-parallel mirror twice, through a second aperture in the second reflective coating. The first and second apertures are coaxial with the optical axis. The concave mirror is devoid a through-opening formed in its substrate.

Embodiments additionally provide an objective having an optical axis and including: (i) a lens group having positive refractive optical power; (ii) a catadioptric group including (iia) a primary front-surface concave mirror having a first substrate with a concave front surface and a rear surface facing the lens group, the concave first surface carrying a reflective coating thereon (where the reflective coating has an opening with a closed circular perimeter, such opening being coaxial with the optical axis), and (iib) a secondary rear-surface mirror having a second substrate configured as a plane-parallel plate (a rear surface of said secondary mirror facing away from the concave first surface, a front surface of said secondary mirror facing the concave front surface). In such an objective, a focal point of the lens group is located between the primary and secondary mirrors; the geometry of the objective satisfies a condition of $1 < L/D < 2.2$; and L is a distance separating the rear surface of the primary concave mirror to a focal point at a wavelength of about 500 nanometers and D is a center thickness of the primary concave mirror. In an embodiment of the objective, the lens group may include an afocal optical relay unit, while a condition of Fa/TL>3 is satisfied (with Fa being a focal length of the afocal optical relay unit at the wavelength, and TL being a total length of the objective measured along the optical axis from a position of an entrance pupil of the objective to an the image plane of the objective).

In a specific version of the latter embodiment the afocal optical relay unit may include a) a front optical unit having a focal length of Fa_f at the chosen wavelength, and b) a rear optical unit having a focal length of Fa_r at such chosen wavelength, while 1.4<Fa_r/Fa_f<2. An objective may be structured according to any of the above-discussed embodiments such that the lens group further includes a positive lens unit disposed between the afocal optical relay unit and the primary concave mirror (the positive lens unit having a focal length of Ff at the chosen wavelength, and the catadioptric group having a focal length of Fc at said wavelength, while the condition 1.6<Fc/Ff<2.4 is satisfied). Finally, in one embodiment of the objective, the rear surface of said primary front-surface concave mirror has a radius of curvature $R_1$ and the concave front surface of the primary front-surface concave mirror has a radius of curvature $R_2$, while the rear surface of the primary front-surface concave mirror and the concave front surface of the primary front-surface concave mirror are not concentric with one another; and a condition of |(2*R1*R2)/{Dai*(R1−R2−D)}|<20 is satisfied (with D being a center thickness of the primary concave mirror and Dia being a diameter of the primary concave mirror).

BRIEF DESCRIPTION OF THE DRAWINGS

The invention will be more fully understood by referring to the following Detailed Description in conjunction with the generally not-to-scale schematic Drawings, of which:

FIGS. 4, 5, 6, 7A, 7B illustrate respective portions of the optical train of FIG. 3;

DETAILED DESCRIPTION

Figure 1A:
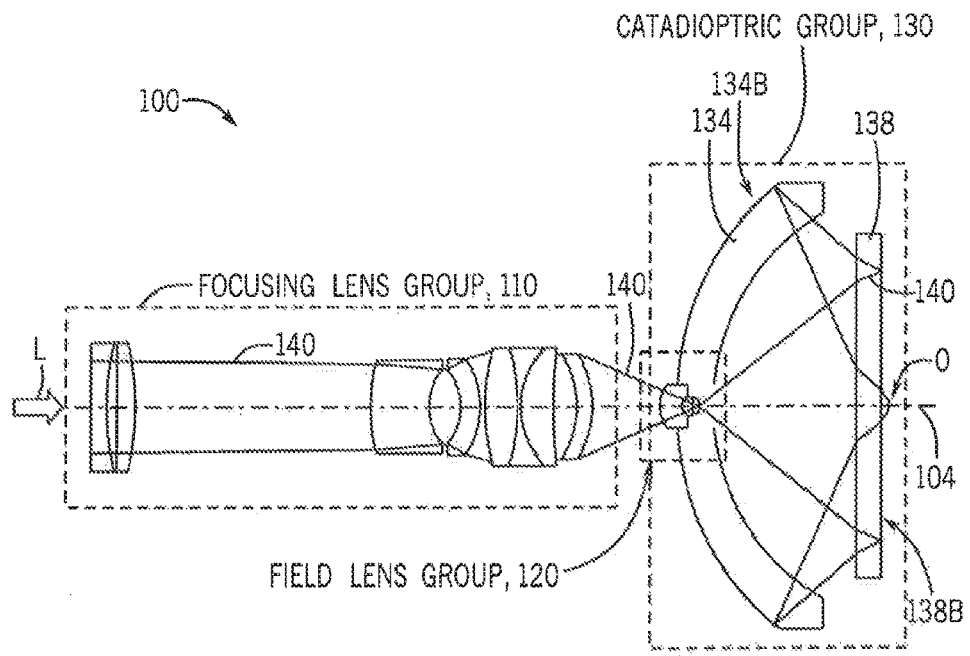
FIGS. 1A, 1B provides diagrams a conventionally-structured catadioptric microscope objective with three primary groups of optical elements (focusing lens group, field lens group, and catadioptric group), in which (i) each of the primary and secondary mirrors of the catadioptric group is a rear-surface (second-surface) mirror, (ii) the primary mirror of the catadioptric group includes an axially-centered through-hole, and (iii) the field lens group is disposed substantially within the catadioptric group.

Implementations of the idea of the present invention respond to practical problems that scourge the fabrication and operation of the conventionally-configured catadioptic microscope objectives. The need in a broadband catadioptric dry microscope objective having a numerical aperture of around NA=0.9 or greater and a central obscuration (for light propagating through the objective) characterized by a numerical aperture of about $NA_{obsc}$=0.05 or lower is addressed by and solved with an optical design of an objective that is color-corrected within the spectral range between at least 190 nm and 900 nm, which design employs a catadioptric group containing a front-surface concave spherical primary mirror (with no through-hole in the substrate) in combination with a plane-parallel rear-surface secondary mirror, and that is devoid of lens elements between the two mirrors and/or within the catadioptric group. The description of the solved practical problems and explanation of the choice of the solution will become apparent from the following description.

In lithography, for example, optical metrology of patterns formed on a semiconductor substrate (in one instance—wafer) and/or fabricated semiconductor chips are often performed with the use of optical measurement systems employing optical diffraction and diffractive optics forming diffracted optical beams of different orders, while often using the polychromatic source of light for illumination of the diffractive optics. In order to extract maximum information about the surface of the semiconductor chip under investigation, it is desirable (a) to make use of as much of the optical pupil of the light-projecting/light-collecting optical system(s) of the lithographic tool as possible and/or (b) to operate within the broadest achievable spectral range, including the DUV wavelength. One of drivers behind improving each and both of these characteristics is the desire to facilitate low sensitivity of the optical imaging, performed with such an objective, to optical artifacts caused by optical diffraction on the pattern-features present at the patterned semiconductor wafer and/or manufactured semiconductor chips (that is/are being tested). This, in turn, implies that when the catadioptric microscope system is used, the central obscuration for light propagating through reflectors of the system has to be minimized. Considerations dictating that the choice of the catadioptric design is preferred are as follows:

The dioptric (or refractive) microscope objectives, while being the standard for visible microscopy, are not the first choice to achieve the goals stated above. The complexity and cost for this style of objective increases depending of the amount of color correction (which, of course, quickly increases when the spectrally-broadband performance of the objective is required). Refractive objectives for use in the DUV are limited by the availability of optical materials. Unfortunately, high numerical aperture (NA) refractive objectives cannot be produced with significant bandwidths that include wavelengths below 350 nm because of the lack of glass types with high transmission and the desired dispersion. Even if some glasses with low transmission are considered, they cannot significantly increase the bandwidth, which remains limited by chromatic aberration due to the similarities in such glasses' spectral dispersion characteristics.

While a catoptric objective (or "all reflective" solution) seems to be an attractive option for a broad-band application, as it substantially does not cause any operational issues with chromatic aberrations across the broad spectral band, and the operational bandwidth is limited in practice only by the spectral characteristics of the mirror coatings, the catoptrics designs possess different operational shortcomings. A catoptric objective is axially symmetric (like the Schwarzschild two mirror design), has limited NA, as well as a large central obscuration causing poor performance in the mid-range of spatial frequencies and limited field size even when large diameter mirrors are used. While there exist varieties of off-axis mirror systems, however these have limited NA's, tend to be large, and offer challenging optical alignment.

Figure 1B:
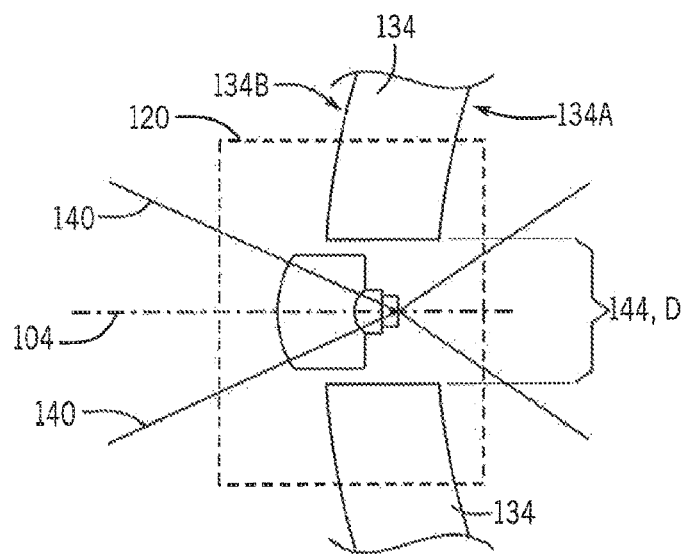

A typical form 100 for a catadioptric objective of the related art having an optical axis 104 is shown in FIGS. 1A, 1B, with FIG. 1B illustrating a central, axial portion of the design. This objective has three primary groups of optical elements: the focusing lens group 110, the field lens group 120, and a catadioptric group 130 including a primary mirror 134 and a secondary mirror 138. Lines 140 denote light (shown as rays) propagated through the objective as a result of input light L accepted from an object by an entrance pupil of the objective. In this design, the primary mirror 134 of the catadioptric group 130 contains a central, axially-disposed hole 144 (having a diameter D) in the body of the mirror 135 and the field lens group 120 is located partially within the catadioptric group, specifically within the hole 144.

The catadioptric group 130 is typically composed of two second surface mirrors or Mangin elements (that is, a reflecting surface of the each of the mirrors 134, 136 is the one that light incident onto a corresponding mirror encounters second, after having traversed another, first surface of such mirror). The term Mangin element or Mangin mirror, as used in related art, refers to and is defined as a negative meniscus lens with the reflective surface on the rear side of the glass forming a curved mirror that reflects light with at least partially or corrected (reduced) spherical aberration or even without spherical aberration.

Light L from the light source illuminates the object O through the objective. Light reflected by the object O enters the catadioptric group 130 through an aperture (not shown) in the Mangin element 138, then reflects from the mirror coatings at the second surface 134B of Mangin element 134 (which is the primary mirror of the objective) and at the second surface 138B of the Mangin element 138 (which is the secondary mirror of the objective) before passing through an aperture or hole 144 in the Mangin element 134 to form an intermediate image I near the field lens group 120, internally with respect to the catadioptric group 130, as shown in FIG. 1B. The location of each of the Mangin elements 134, 138 in relation to the object O or intermediate image I, as well as the diameter of such Mangin element determines the overall amount of obscuration of light by the objective. Light from the internal image I then passes though the field lens group 120 before entering the focusing lens group 110. The focusing lens group 110 is typically designed to correct for the residual aberrations of the catadioptric group 130 and the field lens group 120. The currently available catadioptric objectives implemented according to the embodiment 100 have diameters of greater than 80 mm and lengths greater than 60 mm. This is driven by the desire for large working distances, large numerical apertures, and large field sizes.

Figure 2:
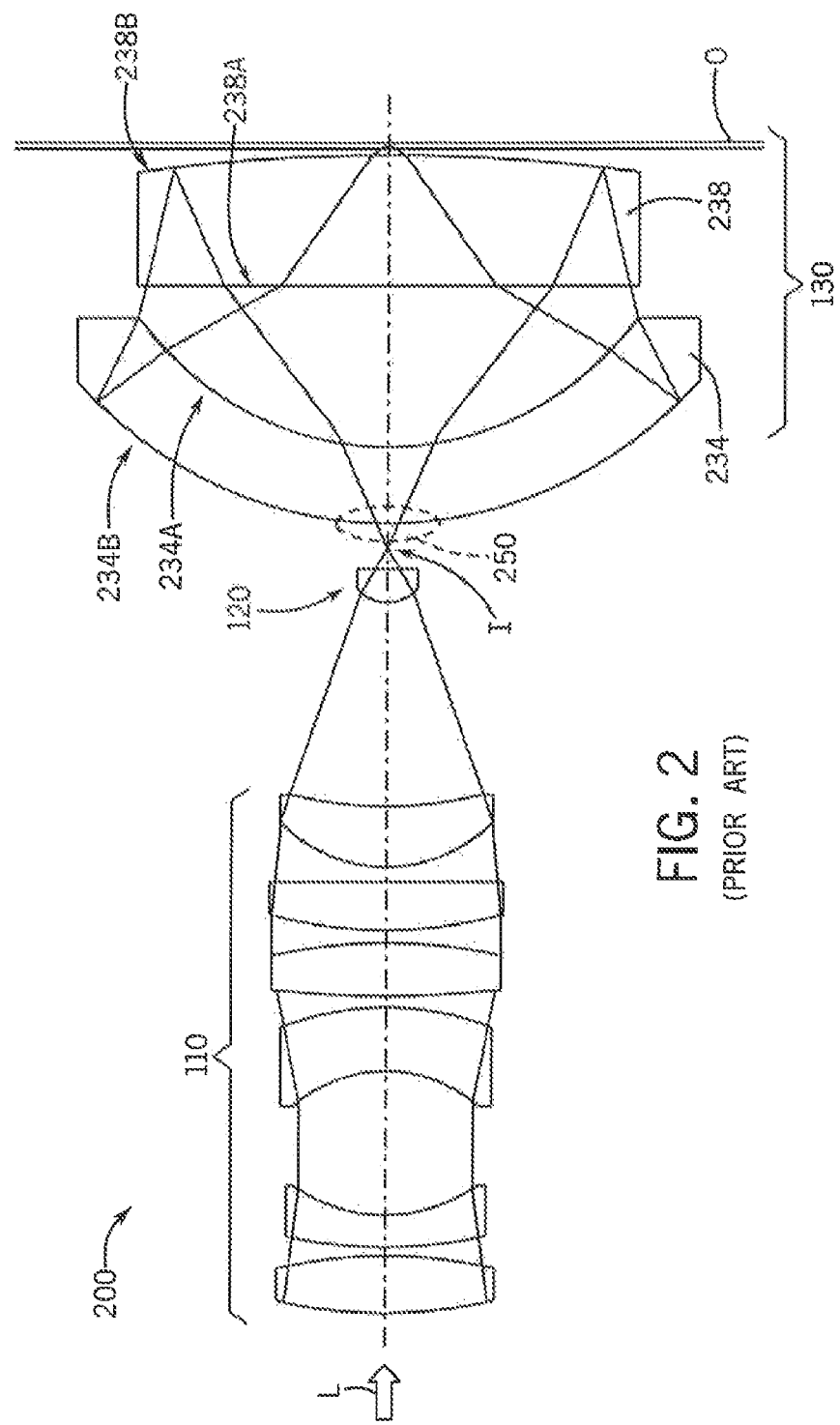
FIG. 2 is an optical diagram schematically illustrating another conventional example of a 9-element catadioptric objective corrected in the spectral bandwidth from 266 nm to 800 nm, in which (i) each of the primary and secondary mirrors of the catadioptric group is a rear-surface (second-surface) mirror, and (ii) the central obscuration of the objective is defined by the lack of the reflective coating at the second surface of the primary mirror.

Another conventional embodiment 200, schematically shown in FIG. 2, provides a catadioptric objective that is based on the Schupmann medial telescope, in which a two lens design that corrects for first order axial color using a single material is substituted with a mirror arrangement 130 to create a real image. Just like the embodiment 100, this design turns on the use of primary and secondary mirrors 234, 238 the second surfaces 234B, 238B of which are used as reflectors. (In other words, a reflecting surface of the each of the mirrors 234, 238 is the one that light, incident onto a corresponding mirror from the object being imaged, encounters second, after having traversed another, first surface of such mirror. The first surfaces of mirrors 234, 238 are marked, according, as 234A, 238B.) While in comparison with the embodiment 100 the objective configured according to the idea of the embodiment 200 is devoid of a central hole in the primary mirror 234 (and/or secondary mirror 238), the central obscuration remains at least because the reflective coating on the second surface 234B of the mirror 234 is removed in the axial region marked as 250 in FIG. 2 to facilitate the delivery of light from the object through the catadioptric group 130 to the field lens 120, the addition of which allows for correction of the second order axial color aberration.

Notably, variations of the design of this type discussed in Proc. SPIE 5523 by D. Shafer et a. (*Current Developments in Lens Design and Optical Engineering V*, vol. 12, Oct. 14, 2004, which is incorporated by reference herein) and providing an objective color-corrected in the range from 266 nm to 800 nm and having a NA of 0.9 and the 25 mm diameter for the largest catadioptric element, includes a curved—not flat—reflective surface 238B and almost concentric surfaces 234A, 234B of the primary mirror 234.

The analysis of the Shafer's overview and the related art (such as, for example, U.S. Pat. Nos. 5,031,976; 5,717,518; 6,064,517; 6,392,793; 6,483,638; 6,560,011; 7,136,234; 7,180,658; 7,307,783; 7,351,980; 7,457,034; 7,646,533; 7,672,043; 7,679,842; 7,869,121; and 8,675,276, most of which are patented by the same group of Shafer et al.) based on which Shafer et al. provided this overview makes it clear that conventionally-designed catadioptric microscope objectives use some combination of either (a) a primary front-surface concave mirror with a hole and a secondary parallel-plate rear-surface mirror; or (b) a primary concave Mangin mirror (known as a mirror containing a reflector formed by a reflecting coating on the rear surface of a negative meniscus lens) without a hole and a secondary rear-surface mirror; or (c) a primary front-surface concave mirror with at least one negative-powered lens between primary and secondary mirrors, as well as a non-plane secondary rear-surface mirror. These configurations all make it difficult or impractical to achieve a small central obscuration of <0.05 NA (especially if elements of the field lens group are located inside or within the central hole of the primary mirror, in which case the central hole must be sufficiently large to include space for lens-mounting contraptions).

Moreover, optical manufacturing is also a factor in the size, complexity and costs for catadioptric designs. For example, as is well known and recognized in the art of optical engineering, highly accurate surfaces are required for the Mangin elements, and any reflective surface surface-figure error or deviation from the target figure is especially important (see, for example, the earlier mentioned D. Shafer reference). At the same time, it has been long established in optical fabrication that the central hole of the mirror additionally present a practical problem: it is difficult to cut or form without degrading the accuracy of the mirror-surface figure. Furthermore, the surfaces of the Mangin mirror (such as any of the mirrors 134, 234 of FIGS. 1A, 2) or separate negative-powered lens elements disposed in-between the two mirrors of the catadioptric group tend to be almost concentric, which—as is readily recognized by a skilled artisan—makes them difficult to manufacture with an accurately ground edge. Moreover, as light from the object has to pass through each of the Mangin elements twice on its way to the field lens group, the Mangin elements have to be manufactured with only half value of the available transmitted wavefront tolerances for each pass, which substantially increases the costs of fabrication of the objective.

Implementations of the present invention, characterized in that the catadioptric group of the catadioptric microscope objective advantageously employ a front-surface concave spherical primary mirror (with no through-hole in the substrate of such mirror, in contradistinction with the methodology established in the related art) and a plane-parallel rear-surface secondary mirror, while, at the same time, containing no lens element and/or, more generally, no optical substrate between these two mirrors and/or within the boundaries of the catadioptric group. (The "front-surface mirror" or the "first-surface mirror" is a mirror, in which a reflecting surface is the one that light incident onto the mirror encounters first.) Such configuration results in addressing the practical limitations of remaining in and recognized by the related art up to date.

Additional notes are in order. The examples of prescription(s) of implementation(s) of an optical system of the objective according to the idea of the invention and the subsystems of such implementations, performed with the optical design program Code V, are summarized in Tables 1 and 2 and are discussed in reference to corresponding Figures. Here, optical elements are numbered in a "backward" fashion, starting with an element labeled as "object" (and located at infinity with respect to the entrance pupil of the objective), which is configured to deliver a collimated beam towards the first optical element of the objective (labeled as "element number 1" in Table(s) and as "1" in the Figure(s)), through the second optical element of the objective (labeled as "2"), and on and towards the semiconductor wafer (in the image plane, labeled as "image" in Table(s) and containing semiconductor-wafer features being viewed through the objective), which makes it easier to define the NA and other optical parameters in the wafer space during the process of optical design. Accordingly, an "image diameter" denotes the dimension of an "object" imaged in light delivered through the embodiment of the objective onto the semiconductor wafer (i.e., onto the "image surface"). Positive value of a radius of curvature of a curved surface indicates the center of the curvature that is to the right of the curved surface, while a negative radius value indicates the center of the curvature that is to the left of the curved surface; dimensions are provided in millimeters; thickness is defined as an axial distance to the next surface; and an image diameter shown is a paraxial value and not a ray-traced value.

Figure 3:
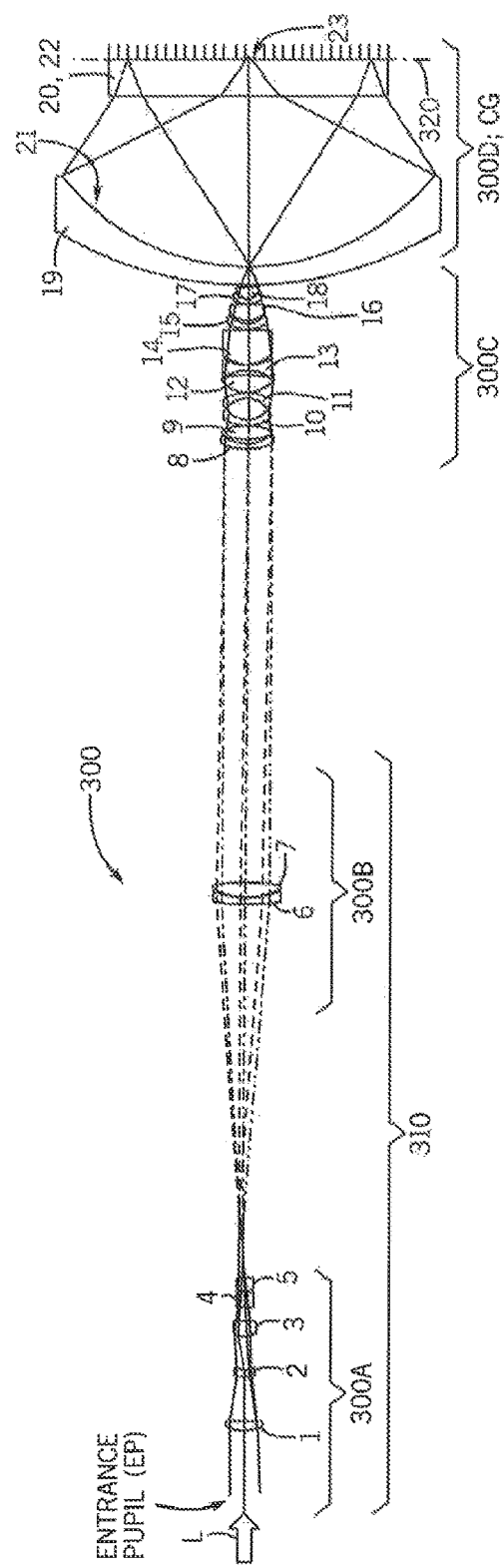
FIG. 3 provides a schematic diagram illustrating an optical train of one embodiment of the invention.

FIG. 3 illustrates the optical design layout 300 for a catadioptric broadband microscope objective configured co-axially with the optical axis 304 according to the idea of the invention. For convenience of illustration, the embodiment 300 is "split" into groups 300A, 300B, 300C, and 300D of the optical elements, which are schematically presented in FIGS. 4, 5, 6, and 7A, 7B, respectively.

Lens elements 1 through 7 (that is, the combination of groups 300A and 300B) form an afocal relay 310 (that is, as an optical system that produces no net convergence or divergence of the beam and has an infinite effective focal length). The relay 310 is configured to provide an operationally-accessible external entrance pupil EP, shown on the left of FIG. 3. A relay lens system 310 includes a first lens group 300A that has positive refractive optical power, and a second lens group 300B having positive refractive optical power. In the first lens group 300A, the negative lens (element 2) is disposed between two immediately adjacent positive lenses (elements 1 and 3). The second lens group 300B contains a collimator doublet, elements 6 and 7 of which are made from two different glass types and separated by an air space. The afocal relay 310 also contributes to some of the aberration correction in the following portion of objective, formed by the optical elements 8 through 22.

The elements 8-22 (forming the groups 300C and 300D) define a kernel objective 3000C forming an intermediate image (in collimated light from the source of illumination, which collimated light is delivered through the afocal relay 300C), and the two mirrors to optically relay the intermediate image to the final image plane 320 (the plane of element 23). Viewed from the prospective of the object located in the plane 23 and in practice interrogated by a microscope equipped with the objective of the embodiment, the two mirrors of the group 300D form an intermediate image located between the surfaces of the two mirrors that are immediately facing each other, which intermediate image is further relayed through the second lens group 300C towards the afocal relay 310.

The combination of the front-surface concave primary mirror (denoted as optical element 19, with a front reflective surface 19A and the back or rear surface 19B) that is devoid of the through-hole and the plane-parallel rear-surface secondary mirror (denoted as optical element 20, having a front surface 20A and the rear reflective surface 20B) forms the catadioptric group (CG) of optical elements of the objective. The hatching R1 on the front surface of 19A denoted the reflective element/coating carries by the substrate of the element 19. The hatching R2 on the rear surface 20B, shown in FIG. 7B, denotes the reflecting element/coating carried by the substrate of the element 20.

It is readily appreciated by a skilled artisan that the implementation of the idea of the invention is drastically different from contraptions proposed by related art in that the spherical primary mirror of the implementation (indicated in FIG. 3 as optical element 19) is not only a front-surface mirror but is, at the same time, also devoid of a through-hole in the substrate (formed along the optical axis 304 or otherwise), as a result of which none of the optical elements of the group 303C is positioned within or inside the catadioptric group 303D. Indeed, in contradistinction with the microscope objectives of the related art (which have the primary mirror configured as either the rear-surface mirror with no through-hole or as a front-surface mirror with a through-hole), the proposed design has no through-hole in an optical element of the catadioptric group, but rather a small circular uncoated area in the middle of the coating (which is defined coaxially with the optical axis of the corresponding mirror and which forms the central obscuration). Embodiments of the objective structured according to the idea of the invention, therefore, contain no Mangin element.

Figure 7A:
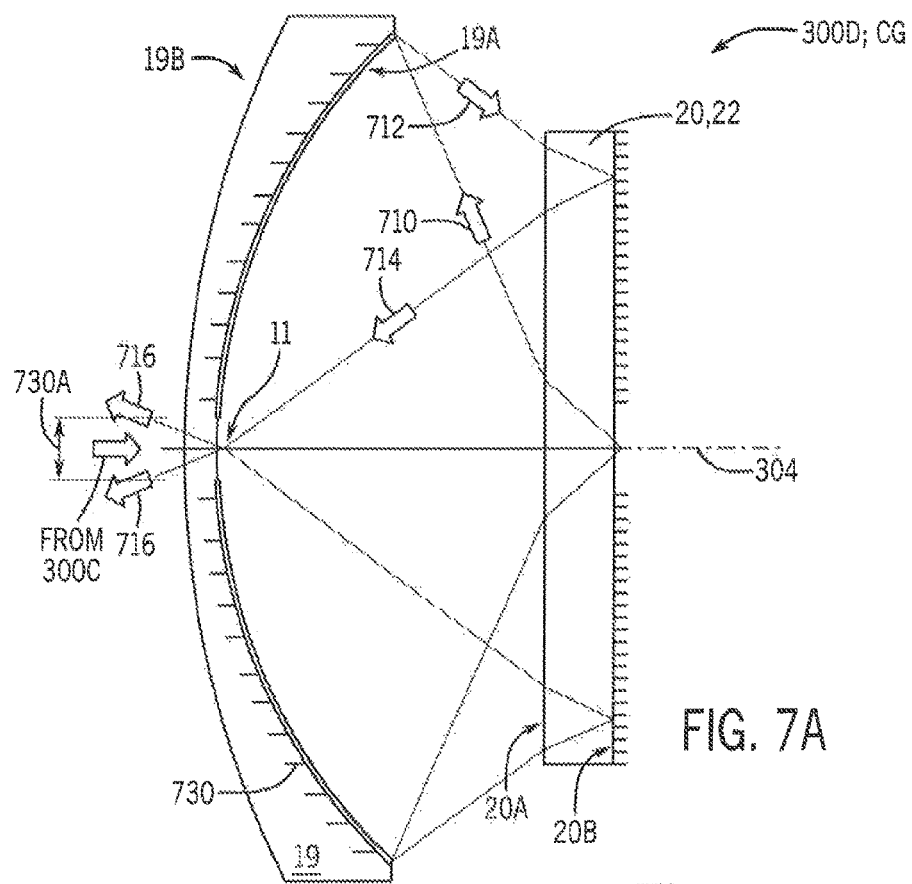
Figure 7B:
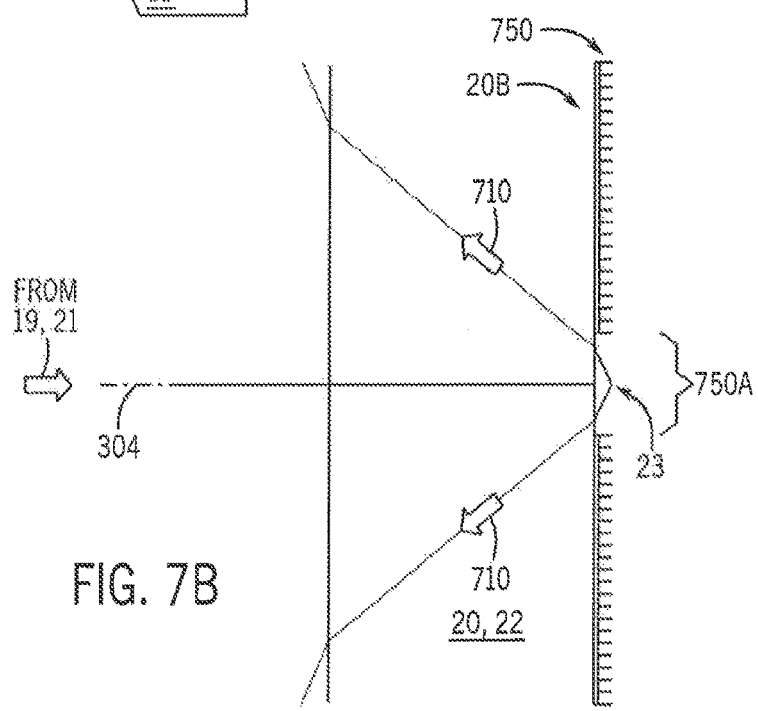

In reference to FIGS. 3 and 7A, 7B, once the physical object (element 23) is illuminated with light L, that has been transmitted from the external source of light through the embodiment of the objective of the present invention and the portion 300C, light reflected by the object (only a marginal ray 710 is shown for simplicity of illustration) enters the catadioptric group 300D through the rear surface 20B of the plane-parallel mirror (20,22) then traverses the front surface 20A of the secondary mirror 20, then reflects from the mirror coating 730 at the front (first) surface 19A of the concave mirror 19 (which is the primary mirror of the objective) as light 712 and the rear surface 20B of the element 20, 22 as light 714 to form an intermediate image II near the front surface 19A, internally with respect to the catadioptric group 300D. Light from the image II then passes through an aperture 730A formed in the reflective coating 730 (which coating is carried by the front surface 19A of the mirror 19) by having the coating be absent in an axially-centered circular area. Light further propagates through the substrate of the primary mirror 19 and the rear surface 19A (which, in one case, is AR-coated) towards the group of lenses 300C as light 716.

Figure 6:
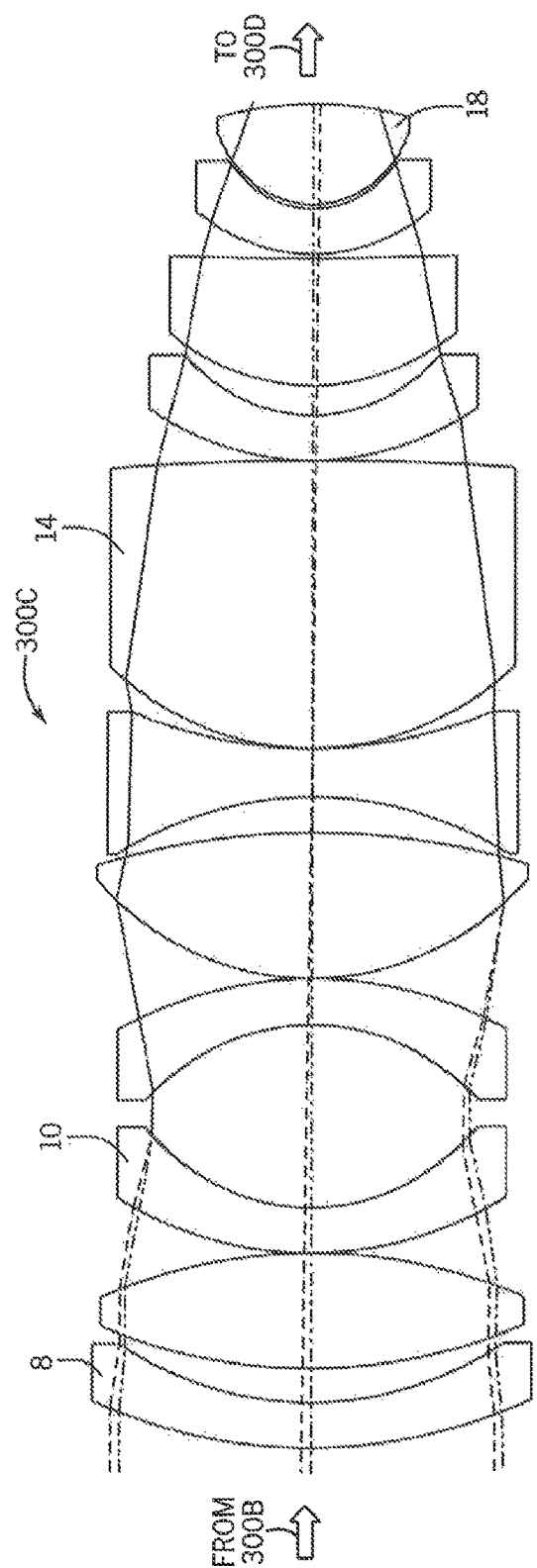

In further reference to FIG. 3 and in reference to FIGS. 4, 5, and 6, light 716 is further propagated through the group 300C of lenses as light towards the afocal relay unit 310, upon which propagation light from the object traverses a pair of meniscus lenses the concave surfaces of which are facing each other. This double-meniscus combination of lenses 10,11 is configured to correct spherical aberration and coma in the objective 300 that is purposely lacking a Mangin element and/or an optical lens in-between the mirrors (used for such aberration correction in objectives of related art). Light from the object is further transmitted, with an optical magnification exceeding unity, through the afocal relay unit 310.

According to the present design, the intermediate image II is very close to the mirror coating 730 and the front surface 19A on the internal side of the mirror 19, which allows for an unusually small optical obscuration defined by the aperture 730, with the NA value of the obscuration being equal to or, generally, smaller than $NA_{obsc}=0.05$ for an objective with $NA_{obj}=0.9$.

The specific position of the intermediate image II with respect to the front surface 19A of the mirror 19 generally varies (in one case, by several mm) over the spectral band of interest, manifesting a need for color-correction of the objective, which is practically achieved with the use of a catadioptric group 300D and, specifically in this case, only with the use of the plane-parallel piece of glass that the secondary mirror coating 750 is deposited on. In other words, according to the idea of the invention and contrary to the implementations of objective in related art (which require the use of several optical elements for correction of chromatic aberrations), such correction in an embodiment of the invention is achieved due to the use of only the element 20.

In advantageous contradistinction with respect to existing solutions of the related art, and owning to formatting the primary mirror of the catadioptric group of the proposed design as the front surface mirror, the problem of the complicated manufacturing of the primary mirror constantly faced by the related art is solved as the primary mirror of the present design is easier to manufacture than either a front-surface concave mirror with a hole, or a rear-surface concave mirror (which is more sensitive to surface form errors on the mirror surface, as well as surface form errors over the whole refracting surface that is passed twice by the reflected light). Indeed, in the implementation of the present invention, the back transmitting surface of the primary mirror (that is, surface 19A) is traversed only once by light reflected from the illuminated object, and over an aperture that is much smaller than the surface of the mirror 19. Moreover— and in stark advantageous contradistinction with the related art, the designs of a primary mirror(s) of which simply cannot afford such structural feature—the radius of the back mirror surface 19A can be freely chosen to avoid an almost-concentric condition that is typical in the related art. As is widely recognized in the related art, a primary mirror the surfaces of which are almost concentric or close to being concentric is difficult to manufacture with accurately centered edges for mounting. As such, the rear (back), non-reflective surface of the primary mirror of the catadioptric group of the present design generally is not concentric with the front, reflective surface of the primary mirror. In other words, generally the rear and front surfaces of the primary mirror do not have a common center of curvature.

A second structural feature of the present design that substantially eases the manufacturing of the secondary mirror 20, 22 is avoidance of any curvature on any of the two surfaces 20A, 20B, with the back plane surface 20B being close to the plane in which the physical object to be imaged by the objective is located, and with the reflecting coating 750 carried at the surface 20B that also has a small clear, uncoated area 750A (coaxial with the axis 304 and having a diameter not exceeding 1.7 mm) that forms an optical obscuration similar to that 730A at the primary mirror close to the intermediate image II.

Table 1 substantiates the prescription of one example of the design, in which it can be seen that two different refractive materials (fused silica and calcium fluoride) are chosen to minimize chromatic aberrations over the unusual for the related art wide spectral band from 190 to 1000 nm. While other refracting materials could be ostensibly used instead of or in addition to calcium fluoride, fused silica is known to possess superior optical transmission at 190 nm, other optical, mechanical and thermal properties, as well as the fact that it has no intrinsic birefringence (which becomes practically important in the case when two mirror substrate are used). As recognized by a person of skill in the art, intrinsic birefringence generally remains a problem because it upsets the polarization state of light passing through the system, which effects the metrology measurements. This effect is worsening as angles of incident of light (corresponding to the NA) are increasing and/or as thickness of glass used for construction of the optical elements increases. Correction of the intrinsic birefringence in an embodiment of the present invention is achieved without the use of a Mangin mirror, by utilizing a front-surface mirror instead, which allows for a higher degree of correction.

Figure 8:
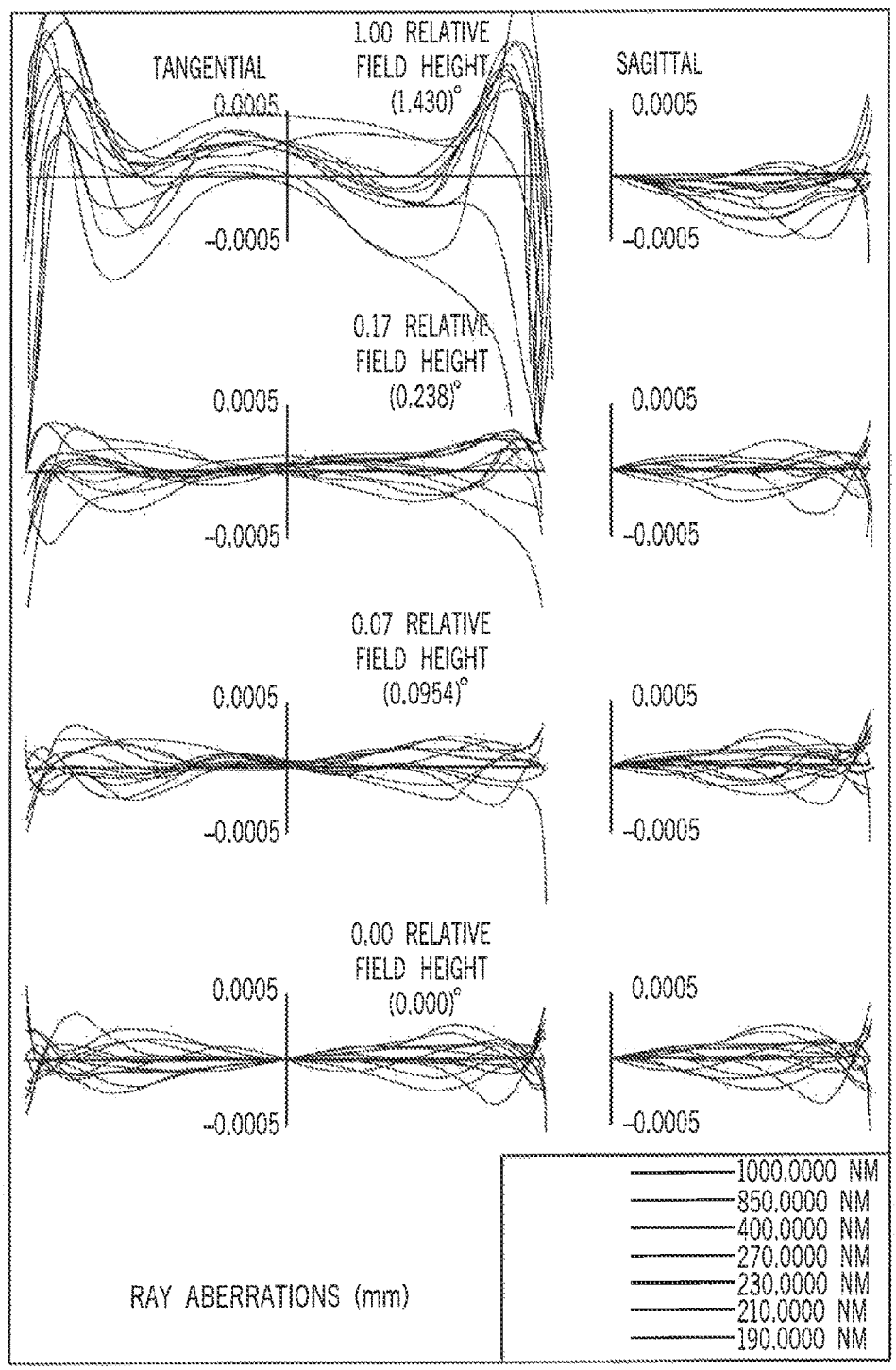
FIGS. 8 and 9 show plots characterizing residual aberrations of the embodiment of FIG. 3.

The residual aberrations are illustrated in FIG. 8 in the form of transverse ray aberrations in, as well as the root-mean-square (rms) wavefront aberrations and Strehl ratios in Table 2, the outmost left column of which provides the values of the fraction optical field. The present design is further advantageous over those of related art in that it permits a degradation in imaging performance at optical fields with field diameters above about 50 microns (and for fields with diameters up to 300 microns), since such degradation does not prevent navigation of the optical field of interest to within the critical field having a 50 microns diameter.

Figure 9:
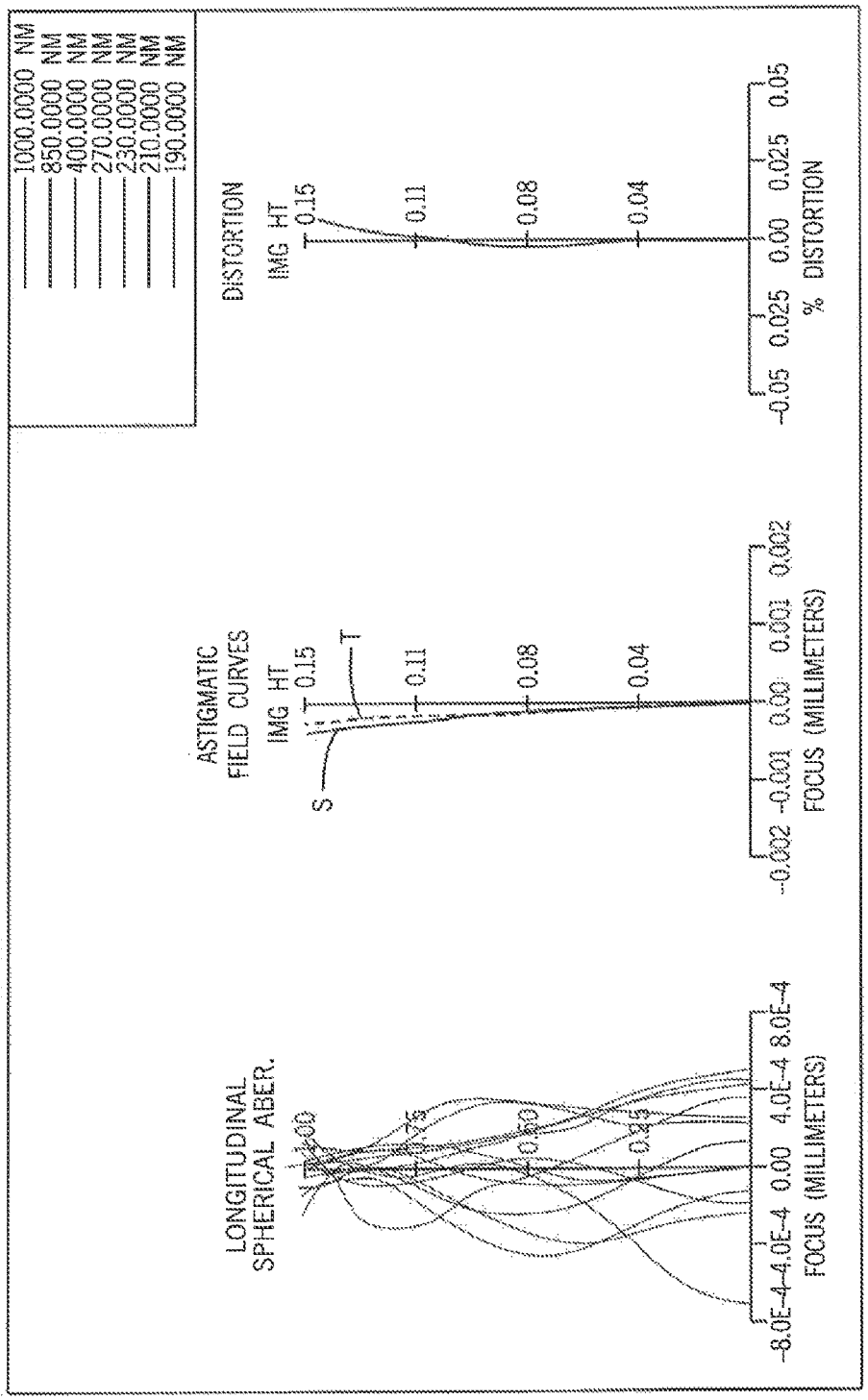

The residual longitudinal chromatic variation of spherical aberration are shown in FIG. 9, along with residual astigmatism, field curvature and distortion. Specific opto-geometrical characteristics of the specific embodiment of the objective are summarized in Tables 3A, 3B.

TABLE 1

| | ELEMENT RADIUS OF CURVATURE | | | APERTURE DIAMETER | | |
|---|---|---|---|---|---|---|
| NUMBER | FRONT | BACK | THICKNESS | FRONT | BACK | GLASS |
| 0 (OBJECT) | INF | | INFINITY | | | |
| APERTURE STOP | | | | 10.0000 | | |
| | | | 22.7396 | | | |
| 1 | 16.0277 CX | INF | 3.1668 | 12.0077 | 11.5716 | 'FSILICA' |
| | | | 15.7007 | | | |
| 2 | INF | 6.8799 CC | 2.0000 | 6.5310 | 5.9475 | 'FSILICA' |
| | | | 11.5614 | | | |
| 3 | 8.3855 CX | 78.3580 CC | 4.9982 | 7.3552 | 6.4143 | 'FSILICA' |
| | | | 4.8426 | | | |
| 4 | −10.1109 CC | 4.7335 CC | 4.9982 | 5.1271 | 4.9671 | 'FSILICA' |
| | | | 0.3632 | | | |
| 5 | 5.2039 CX | −13.8841 CX | 4.9999 | 5.1812 | 5.2766 | 'CAF2' |
| | | | 130.2696 | | | |
| 6 | 93.9052 CX | 29.0096 CC | 2.0000 | 23.0245 | 23.1490 | 'FSILICA' |
| | | | 0.3502 | | | |
| 7 | 29.3344 CX | −99.9533 CX | 5.1061 | 23.3252 | 23.4278 | 'CAF2' |
| | | | 148.0635 | | | |
| 8 | 27.3561 CX | 16.9154 CC | 2.0000 | 19.0257 | 18.2797 | 'FSILICA' |
| | | | 1.5971 | | | |
| 9 | 30.0819 CX | −29.8579 CX | 4.8637 | 18.3584 | 18.2536 | 'FSILICA' |
| | | | 0.1006 | | | |
| 10 | 18.6051 CX | 10.8897 CC | 2.0000 | 16.8603 | 15.1042 | 'FSILICA' |
| | | | 8.0692 | | | |
| 11 | −11.2567 CC | −22.2826 CX | 2.0000 | 15.0258 | 16.6645 | 'FSILICA' |
| | | | 0.1006 | | | |
| 12 | 14.1965 CX | −40.9025 CX | 6.4583 | 18.5744 | 17.9821 | 'FSILICA' |
| | | | 1.6085 | | | |
| 13 | −18.5491 CC | 22.0562 CC | 2.0000 | 17.7425 | 17.2722 | 'CAF2' |
| | | | 0.1000 | | | |
| 14 | 14.7144 CX | −392.7177 CX | 12.6032 | 17.6161 | 14.8927 | 'FSILICA' |
| | | | 0.1000 | | | |
| 15 | 14.4359 CX | 8.1429 CC | 2.0000 | 14.0439 | 12.1980 | 'FSILICA' |
| | | | 1.3736 | | | |
| 16 | 11.6611 CX | 91.0034 CC | 5.6542 | 12.2022 | 10.7060 | 'FSILICA' |
| | | | 0.2000 | | | |
| 17 | 9.8000 CX | 5.1117 CC | 2.0000 | 10.0176 | 8.1701 | 'FSILICA' |
| | | | 0.1000 | | | |
| 18 | 5.0500 CX | −21.0363 CX | 4.3636 | 8.1785 | 6.8040 | 'CAF2' |
| | | | 0.2800 | | | |
| 19 | 150.0000 CX | 92.5180 CC | 5.6000 | 6.0247 | 1.3728 | 'FSILICA' |
| | | | 60.3739 | | | |
| 20 | INF | INF | 12.5935 | 80.6627 | 91.1227 | 'FSILICA' |
| | | INF | | 91.1227 | | REFL |
| | INF | INF | −12.5935 | 91.1227 | 91.1227 | 'FSILICA' |
| | | | −60.3739 | | | |
| 21 | | 92.5180 CC | 60.3739 | 139.9976 | | REFL |
| 22 | INF | INF | 12.5935 | 22.7605 | 3.1585 | 'FSILICA' |
| | IMAGE DISTANCE = | | 0.7000 | | | |
| IMAGE | | INF | | 0.3000 | | |

NOTES

Positive radius indicates the center of curvature is to the right
Negative radius indicates the center of curvature is to the left
Dimensions are given in millimeters
Thickness is axial distance to next surface
Image diameter shown above is a paraxial value, it is not a ray traced value
REFERENCE WAVELENGTH = 500.0 NM
SPECTRAL REGION = 190.0-1000.0 NM
INFINITE CONJUGATES
EFL = 6.0078
BFL = 0.7000, measured from the last surface
FFL = −0.1289, measured from the first surface
F/NO = 0.5556
IMAGE DIST = 0.7000
OAL = 499.3000
PARAXIAL IMAGE HT = 0.1500
SEMI-FIELD ANGLE = 1.4302
ENTR PUPIL DIAMETER = 10.8140
DISTANCE = 0.0000
EXIT PUPIL DIAMETER = 504.1891
DISTANCE = −279.4051

TABLE 2

| WAVELENGTHS | | | | | | | | | | | | |
|---|---|---|---|---|---|---|---|---|---|---|---|---|
| 1000.0 | 800.0 | 650.0 | 500.0 | 400.0 | 300.0 | 270.0 | 250.0 | 230.0 | 220.0 | 210.0 | 200.0 | 190.0 |
| WEIGHTS | | | | | | | | | | | | |
| 1 | 1 | 1 | 1 | 1 | 1 | 1 | 1 | 1 | 1 | 1 | 1 | 1 |

| | | BEST INDIVIDUAL FOCUS | | | | BEST COMPOSITE FOCUS | | | |
|---|---|---|---|---|---|---|---|---|---|
| FIELD FRACT | DEG | SHIFT (MM.) | FOCUS (MM.) | RMS (WAVES) | STREHL | SHIFT (MM.) | FOCUS (MM.) | RMS (WAVES) | STREHL |
| X 0.00 | 0.00 | 0.000000 | 0.000042 | 0.0592 | 0.871 | 0.000000 | 0.000025 | 0.0598 | 0.869 |
| Y 0.00 | 0.00 | 0.000000 | | | | 0.000000 | | | |
| X 0.00 | 0.00 | 0.000000 | 0.000042 | 0.0626 | 0.857 | 0.000000 | 0.000025 | 0.0631 | 0.854 |
| Y 0.07 | 0.10 | 0.000012 | | | | 0.000013 | | | |
| X 0.00 | 0.00 | 0.000000 | 0.000037 | 0.0781 | 0.786 | 0.000000 | 0.000025 | 0.0782 | 0.785 |
| Y 0.17 | 0.24 | 0.000030 | | | | 0.000031 | | | |
| X 0.00 | 0.00 | 0.000000 | −0.000175 | 0.2928 | 0.034 | 0.000000 | 0.000025 | 0.3079 | 0.024 |
| Y 1.00 | 1.43 | −0.000017 | | | | −0.000039 | | | |

COMPOSITE RMS FOR POSITION 1: 0.10477 (Units of RMS are waves at 226.8 nm)

TABLE 3A

Example of Specific Opto-Geometrical Parameters of Embodiment 300

| Parameter | | Value, mm |
|---|---|---|
| Focal length values (at wavelength of 500 nm) | Fa (focal length of the combination of groups 300A, 300B, and 310 of optical elements) | 2232.8 |
| | Fa_f (focal length of group 300A) | 73.4 |
| | Fa_r (focal length of group 300B) | 121.6 |
| | Ff (focal length of group 310) | 20.2 |
| | Fc (focal length of catadioptric group 300D) | 39.9 |
| TL (total length of the embodiment, along axis 304, from entrance pupil EP to surface 20B) | | 500 |
| L (axial distance from rear-surface 19B of mirror 19 to focal point of objective) | | 5.97 |
| D (center thickness of concave mirror 19) | | 5.6 |
| R1 (radius of curvature of rear-surface 19B of concave mirror 19) | | 150 |
| R2 (radius of curvature of front-surface 19A of concave mirror 19) | | 92.52 |
| Dai (diameter of concave mirror 19) | | 140 |

TABLE 3B

Example of Specific Conditional Parameters and general ranges of conditional parameters in various implementations:

| | Specific Value |
|---|---|
| L/D | 1.07 (preferably, between 1 and 2.2) |
| Fa/TL | 4.47 (preferably, greater than 3) |
| Fa_r/Fa_f | 1.66 (preferably, between 1.4 and 2) |
| Fc/Ff | 1.98 (preferably, between 1.6 and 2.4) |
| $\|(2 * R1 * R2)/\{Dai * (R1 - R2 - D)\}\|$ | 3.82 (preferably, less than 20) |

References throughout this specification to "one embodiment," "an embodiment," "a related embodiment," or similar language mean that a particular feature, structure, or characteristic described in connection with the referred to "embodiment" is included in at least one embodiment of the present invention. Thus, appearances of the phrases "in one embodiment," "in an embodiment," and similar language throughout this specification may, but do not necessarily, all refer to the same embodiment. It is to be understood that no portion of disclosure, taken on its own and in possible connection with a figure, is intended to provide a complete description of all features of the invention.

Within this specification, embodiments have been described in a way that enables a clear and concise specification to be written, but it is intended and will be appreciated that embodiments may be variously combined or separated without parting from the scope of the invention. In particular, it will be appreciated that each of the features described herein is applicable to most if not all aspects of the invention.

In addition, when the present disclosure describes features of the invention with reference to corresponding drawings (in which like numbers represent the same or similar elements, wherever possible), the depicted structural elements are generally not to scale, for purposes of emphasis and understanding. It is to be understood that no single drawing is intended to support a complete description of all features of the invention. In other words, a given drawing is generally descriptive of only some, and not necessarily all, features of the invention. A given drawing and an associated portion of the disclosure containing a description referencing such drawing do not, generally, contain all elements of a particular view or all features that can be presented is this view, at least for purposes of simplifying the given drawing and discussion, and directing the discussion to particular elements that are featured in this drawing. A skilled artisan will recognize that the invention may possibly be practiced without one or more of the specific features, elements, components, structures, details, or characteristics, or with the use of other methods, components, materials, and so forth. Therefore, although a particular detail of an embodiment of the invention may not be necessarily shown in each and every drawing describing such embodiment, the presence of this particular detail in the drawing may be implied unless the context of the description requires otherwise. The described single features, structures, or characteristics of the invention may be combined in any suitable manner in one or more further embodiments.

Figure 10:
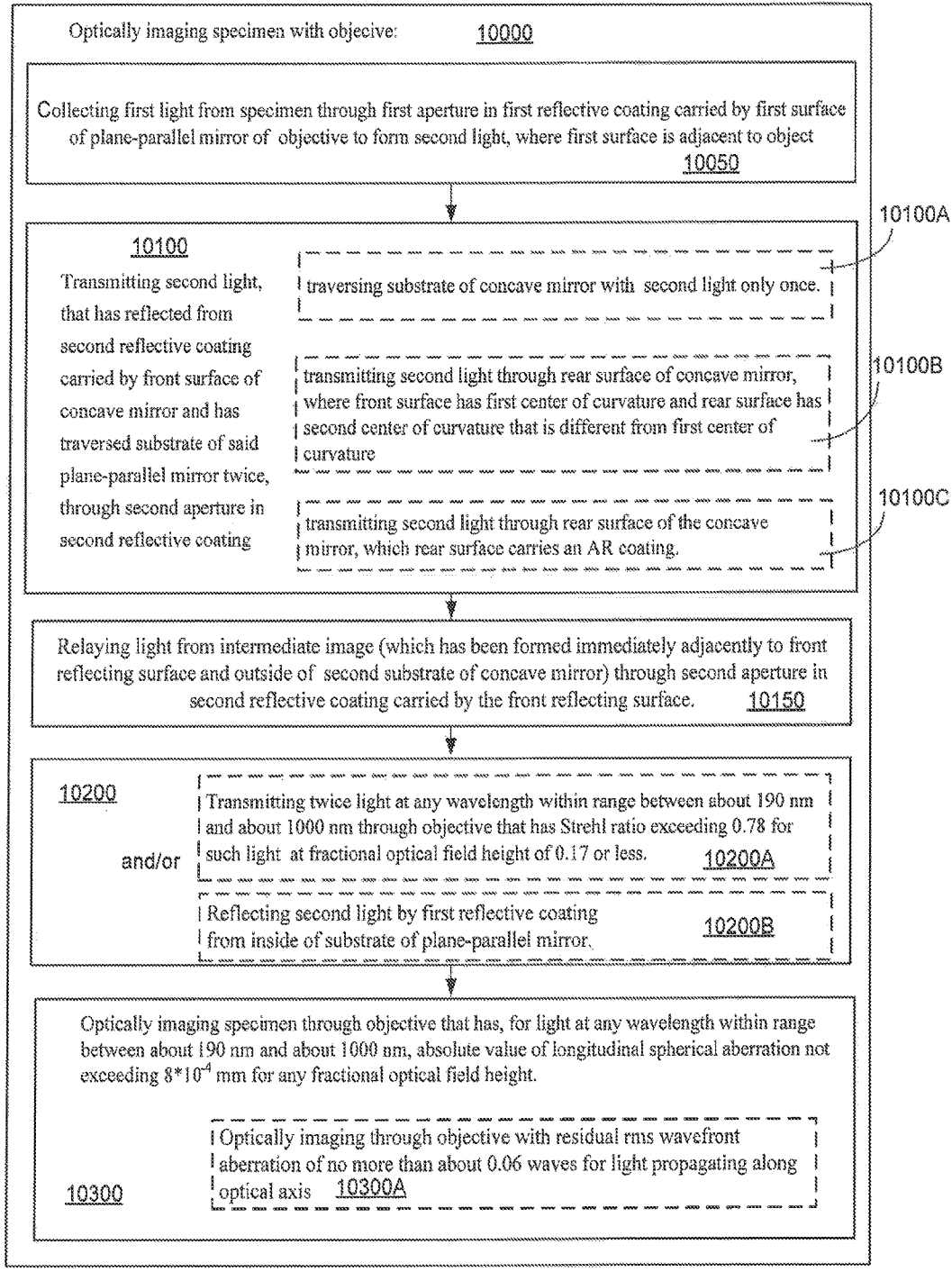
FIG. 10 presents a flow-chart of a process for forming an image with a microscope objective structured according to an embodiment of the invention.

As an illustration, an embodiment of the invention also provides a method for forming an image with a microscope objective. As schematically illustrated in a flow-chart 10000 of FIG. 10, such method includes acquiring radiation (at step 10050) received through a first aperture in a first reflective coating carried by a surface of a plane-parallel mirror of said objective; and transmitting such radiation (at step 10100), which has been reflected by a front reflecting surface of a concave mirror, twice through a first substrate of the plane-parallel mirror prior. The method further includes a step 10150 of relaying light from an intermediate image (which has been formed immediately adjacently to the front reflecting surface and outside a second substrate of the concave mirror) through a second aperture in a second reflective coating carried by the front reflecting surface.

The step 10100 of transmitting may include traversing (at step 10100A) the substrate of the concave mirror with the second light only once and/or transmitting said second light through a rear surface of the concave mirror (while the front surface has a first center of curvature and the rear surface has a second center of curvature, these first and second first and second centers of curvature being different from one another). Alternatively or in addition, the step 10100 of transmitting may include (i) transmitting the second light through a rear surface of the concave mirror (where the front surface has a first center of curvature and the rear surface has a second center of curvature, such first and second centers of curvature being different from one another), at step 10100B; and/or (ii) transmitting the second light through a rear surface of the concave mirror (the rear surface carrying an antireflective coating), at step 10100C. The method may further include, in addition or alternatively, the step 10200A of transmitting twice light at any wavelength within a range between 190 nm and 1000 nm through the objective (where said objective has a Strehl ratio exceeding 0.78 for said light at a fractional optical field height of 0.17 or less) and/or the step 10200B of reflecting the second light by the first reflective coating from inside a substrate of the plane-parallel mirror. Furthermore, in one implementation, alternatively or in addition, the step of optically imaging includes any of (a) optically imaging the specimen through the objective having, for light at any wavelength within a range between about 190 nm and about 1000 nm, an absolute value of longitudinal spherical aberration not exceeding about $8*10^{-4}$ mm for any fractional optical field height; and (b) optically imaging the specimen through the objective having, for light at any wavelength within a range between about 190 nm and about 1000 nm, such that a residual absolute astigmatism value not exceeding about 0.0005 mm for any fractional height of optical field of 0.15 or less. An embodiment of the method may further contain optical imaging configured to include, at step 10300, optically imaging the specimen through the objective forming, for light at any wavelength within a range between about 190 nm and about 1000 nm, a residual root-mean-square wavefront aberration of no more than about 0.08 waves for any fractional height of optical field of 0.17 or less. In a specific implementation of the latter, the step of optically imaging may include optically imaging (at 10300A) through the objective with a residual root-mean-square wavefront aberration of no more than about 0.06 waves for the light propagating along the optical axis.

The invention as recited in claims appended to this disclosure is intended to be assessed in light of the disclosure as a whole, including features disclosed in prior art to which reference is made.

For the purposes of this disclosure and the appended claims, the use of the terms "substantially", "approximately", "about" and similar terms in reference to a descriptor of a value, element, property or characteristic at hand is intended to emphasize that the value, element, property, or characteristic referred to, while not necessarily being exactly as stated, would nevertheless be considered, for practical purposes, as stated by a person of skill in the art. These terms, as applied to a specified characteristic or quality descriptor means "mostly", "mainly", "considerably", "by and large", "essentially", "to great or significant extent", "largely but not necessarily wholly the same" such as to reasonably denote language of approximation and describe the specified characteristic or descriptor so that its scope would be understood by a person of ordinary skill in the art. In one specific case, the terms "approximately", "substantially", and "about", when used in reference to a numerical value, represent a range of plus or minus 20% with respect to the specified value, more preferably plus or minus 10%, even more preferably plus or minus 5%, most preferably plus or minus 2% with respect to the specified value. As a non-limiting example, two values being "substantially equal" to one another implies that the difference between the two values may be within the range of +/−20% of the value itself, preferably within the +/−10% range of the value itself, more preferably within the range of +/−5% of the value itself, and even more preferably within the range of +/−2% or less of the value itself.

The use of these terms in describing a chosen characteristic or concept neither implies nor provides any basis for indefiniteness and for adding a numerical limitation to the specified characteristic or descriptor. As understood by a skilled artisan, the practical deviation of the exact value or characteristic of such value, element, or property from that stated falls and may vary within a numerical range defined by an experimental measurement error that is typical when using a measurement method accepted in the art for such purposes.

It is also to be understood that no single drawing is intended to support a complete description of all features of the invention. In other words, a given drawing is generally descriptive of only some, and generally not all, features of the invention. A given drawing and an associated portion of the disclosure containing a description referencing such drawing do not, generally, contain all elements of a particular view or all features that can be presented is this view, for purposes of simplifying the given drawing and discussion, and to direct the discussion to particular elements that are featured in this drawing. A skilled artisan will recognize that the invention may possibly be practiced without one or more of the specific features, elements, components, structures, details, or characteristics, or with the use of other methods, components, materials, and so forth. Therefore, although a particular detail of an embodiment of the invention may not be necessarily shown in each and every drawing describing such embodiment, the presence of this detail in the drawing may be implied unless the context of the description requires otherwise. In other instances, well known structures, details, materials, or operations may be not shown in a given drawing or described in detail to avoid obscuring aspects of an embodiment of the invention that are being discussed.

The invention as recited in claims appended to this disclosure is intended to be assessed in light of the disclosure as a whole, including features disclosed in prior art to which reference is made.

While the description of the invention is presented through the above examples of embodiments, those of ordinary skill in the art understand that modifications to, and variations of, the illustrated embodiments may be made without departing from the inventive concepts disclosed herein. The invention should not be viewed as being limited to the disclosed examples.

What is claimed is:

1. An objective having an optical axis and comprising:
   an afocal optical relay unit;
   a lens group having positive refractive optical power;

a catadioptric group including
   a primary front-surface concave mirror having a first substrate with a concave front surface and a rear surface facing the lens group, the concave front surface carrying a reflective coating thereon,
      wherein said reflective coating has an opening, said opening being coaxial with the optical axis,
   and
   a secondary rear-surface mirror having a second substrate, a rear surface of said secondary rear-surface mirror facing away from the concave front surface, a front surface of said secondary rear-surface mirror facing the concave front surface,
wherein a focal point of the lens group is located between said primary front-surface mirror and said secondary rear-surface mirror,
wherein geometry of the objective satisfies a condition of $1<L/D<2.2$,
wherein L is a distance separating the rear surface of the primary front-surface concave mirror from the focal point defined at a wavelength of 500 nanometers and D is a center thickness of the primary front-surface concave mirror;
wherein the lens group further includes a positive lens unit disposed between the afocal optical relay unit and the primary front-surface concave mirror, the positive lens unit having a focal length of Ff at said wavelength;
wherein the catadioptric group has a focal length of Fc at said wavelength; and
wherein $1.6<Fc/Ff<2.4$.

2. An objective according to claim 1,
wherein a condition of $Fa/TL>3$ is satisfied,
wherein Fa is a focal length of the afocal optical relay unit at said wavelength,
wherein TL is a total length of the objective measured along the optical axis from a position of an entrance pupil of the objective to an image plane of the objective.

3. An objective according to claim 1,
wherein the afocal optical relay unit includes
   a) a front optical unit having a focal length of Fa_f at said wavelength, and
   b) a rear optical unit having a focal length of Fa_r at said wavelength, and
wherein $1.4<Fa\_r/Fa\_f<2$.

4. An objective according having an optical axis and comprising:
a lens group having positive refractive optical power;
a catadioptric group including
   a primary front-surface concave mirror having a first substrate with a concave front surface and a rear surface facing the lens group, the concave front surface carrying a reflective coating thereon,
      wherein said reflective coating has an opening, said opening being coaxial with the optical axis,
   and
   a secondary rear-surface mirror having a second substrate, a rear surface of said secondary rear-surface mirror facing away from the concave front surface, a front surface of said secondary rear-surface mirror facing the concave front surface,
wherein a focal point of the lens group is located between said primary front-surface mirror and said secondary rear-surface mirror,
wherein geometry of the objective satisfies a condition of $1<L/D<2.2$, wherein L is a distance separating the rear surface of the primary front-surface concave mirror from the focal point defined at a wavelength of 500 nanometers, and D is a center thickness of the primary concave mirror;
wherein the rear surface of said primary front-surface concave mirror has a radius of curvature $R_1$;
wherein the concave front surface of said primary front-surface concave mirror has a radius of curvature $R_2$;
wherein said rear surface of said primary front-surface concave mirror and said concave front surface of said primary front-surface concave mirror are not concentric with one another; and
wherein a condition of $|(2*R1*R2)/\{Dia*(R1-R2-D)\}|<20$ is satisfied, D being a center thickness of the primary concave mirror and Dia being a diameter of the primary front-surface concave mirror.

5. An objective according to claim 4,
further comprising an afocal optical relay unit, wherein a condition of $Fa/TL>3$ is satisfied,
wherein Fa is a focal length of the afocal optical relay unit at said wavelength,
wherein TL is a total length of the objective measured along the optical axis from a position of an entrance pupil of the objective to an image plane of the objective.

6. An objective according to claim 5,
wherein the afocal optical relay unit includes
   a) a front optical unit having a focal length of Fa_f at said wavelength, and
   b) a rear optical unit having a focal length of Fa_r at said wavelength, and
wherein $1.4<Fa\_r/Fa\_f<2$.

7. An objective according to claim 1, which is devoid of a Mangin element.

8. An objective according to claim 1, wherein said lens group includes first and second meniscus lenses that are immediately adjacent to one another, a concave surface of the first meniscus lens and a concave surface of the second meniscus lens facing each other.

9. An objective according to claim 1, wherein the rear surface of the secondary rear-surface mirror is perpendicular to the optical axis.

10. An objective according to claim 1, wherein the rear surface and the concave front surface of said primary front-surface concave mirror are not concentric with one another.

11. An objective according to claim 4, which is devoid of a Mangin element.

12. An objective according to claim 4, wherein said lens group includes first and second meniscus lenses that are immediately adjacent to one another, a concave surface of the first meniscus lens and a concave surface of the second meniscus lens facing each other.

13. An objective according to claim 4, wherein the rear surface of the secondary rear-surface mirror is perpendicular to the optical axis.

* * * * *